US011188276B1

(12) United States Patent
Kuwahara et al.

(10) Patent No.: US 11,188,276 B1
(45) Date of Patent: Nov. 30, 2021

(54) PRINTING DEVICE RECOVERY

(71) Applicant: KYOCERA Document Solutions Inc., Osaka (JP)

(72) Inventors: Tomohiro Kuwahara, Torrance, CA (US); David Shamtoub, Los Angeles, CA (US); Zsolt Hajdu, Torrance, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/942,661

(22) Filed: Jul. 29, 2020

(51) Int. Cl.
*G06F 3/12* (2006.01)
*H04N 1/00* (2006.01)

(52) U.S. Cl.
CPC ............ *G06F 3/121* (2013.01); *G06F 3/1234* (2013.01); *G06F 3/1273* (2013.01); *H04N 1/00957* (2013.01)

(58) Field of Classification Search
None
See application file for complete search history.

(56) References Cited

U.S. PATENT DOCUMENTS

| 7,706,003 | B2 | 4/2010 | Uruma | |
|---|---|---|---|---|
| 8,174,716 | B2 | 5/2012 | Murata et al. | |
| 2008/0037048 | A1* | 2/2008 | Hopper | G06F 3/1205 358/1.13 |
| 2009/0040547 | A1* | 2/2009 | Ferlitsch | G06F 3/1208 358/1.15 |
| 2020/0125310 | A1* | 4/2020 | Krishnasamy | G06F 3/1259 |

\* cited by examiner

*Primary Examiner* — Dov Popovici
(74) *Attorney, Agent, or Firm* — W. Webostad

(57) ABSTRACT

Methods and apparatuses relate generally to printing device recover. In an example thereof, a log associated with a printing device is checked for at least one print job having an incomplete state for a status of the at least one print job. For the at least one print job having the incomplete state, it is determined whether data input for the at least one print job is for a completely received and fully stored version of the at least one print job in storage of the printing device including in a rasterized form. The at least one print job is restarted using the data input recovered from the storage for the data input determined to be complete and fully stored in the storage.

20 Claims, 12 Drawing Sheets

PRINTING DEVICE RECOVERY

FIELD

The following description relates to data recovery for an electronic device. More particularly, the following description relates to printing device recovery of an in-process job.

BACKGROUND

Conventionally, when a printing device was interrupted from completing servicing of a job, the entire job had to be performed again after restarting such printing device. This cost meant having to spend additional time in beginning again.

SUMMARY

In accordance with one or more below described examples, a method relating generally to printing device recovery is disclosed. In such a method, a log associated with a printing device is checked for at least one print job having an incomplete state for a status of the at least one print job. For the at least one print job having the incomplete state, it is determined whether data input for the at least one print job is for a completely received and fully stored version of the at least one print job in storage of the printing device including in a rasterized form. The at least one print job is restarted using the data input recovered from the storage for the data input determined to be complete and fully stored in the storage.

In accordance with one or more below described examples, an apparatus relating generally to printing device recovery is disclosed. In such an apparatus, a printing device is configured with a job manager having control of an input management device, an edit management device, and an output management device. Storage of the printing device is configured for communication with the input management device, the edit management device, and the output management device. The input management device configured to: receive a job; and for the job in a page description language, rasterize the job with a raster image processor of the printing device to provide one or more rasterized pages. The storage is configured to store the job with the one or more rasterized pages and maintain a log to record status of the job. The edit management device is coupled to the storage to obtain the one or more rasterized pages and in communication with the input management device to receive a first handoff of the job. The output management device is coupled: to the storage to obtain the one or more rasterized pages, for communication with the edit management device to receive a second handoff of the job, and to provide the one or more rasterized pages to a print engine of the printing device. The job manager is configured to: check the log for the job having an incomplete state for the status of the job; for the job having the incomplete state, determine the one or more rasterized pages are for a completely received and fully stored version of the job in the storage; and restart the job using the one or more rasterized pages recovered from the storage for the one or more rasterized pages determined to be complete and fully stored in the storage.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

FIG. 2-1 is a flow diagram depicting an example of a printing device recovery operations flow.

FIG. 2-2 is a flow diagram depicting an example of another printing device recovery operations flow.

FIG. 4-1 is a block diagram depicting an example of a printing device in an operations mode.

FIG. 4-2 is a block diagram depicting an example of another printing device in an operations mode.

FIG. 5-1 is a block diagram depicting an example of the printing device of FIG. 4-1 in an operational state of a recovery mode after an interruption in service.

FIG. 5-2 is a block diagram depicting an example of the printing device of FIG. 4-2 in an operational state of a recovery mode after an interruption in service.

DETAILED DESCRIPTION

Figure 1:
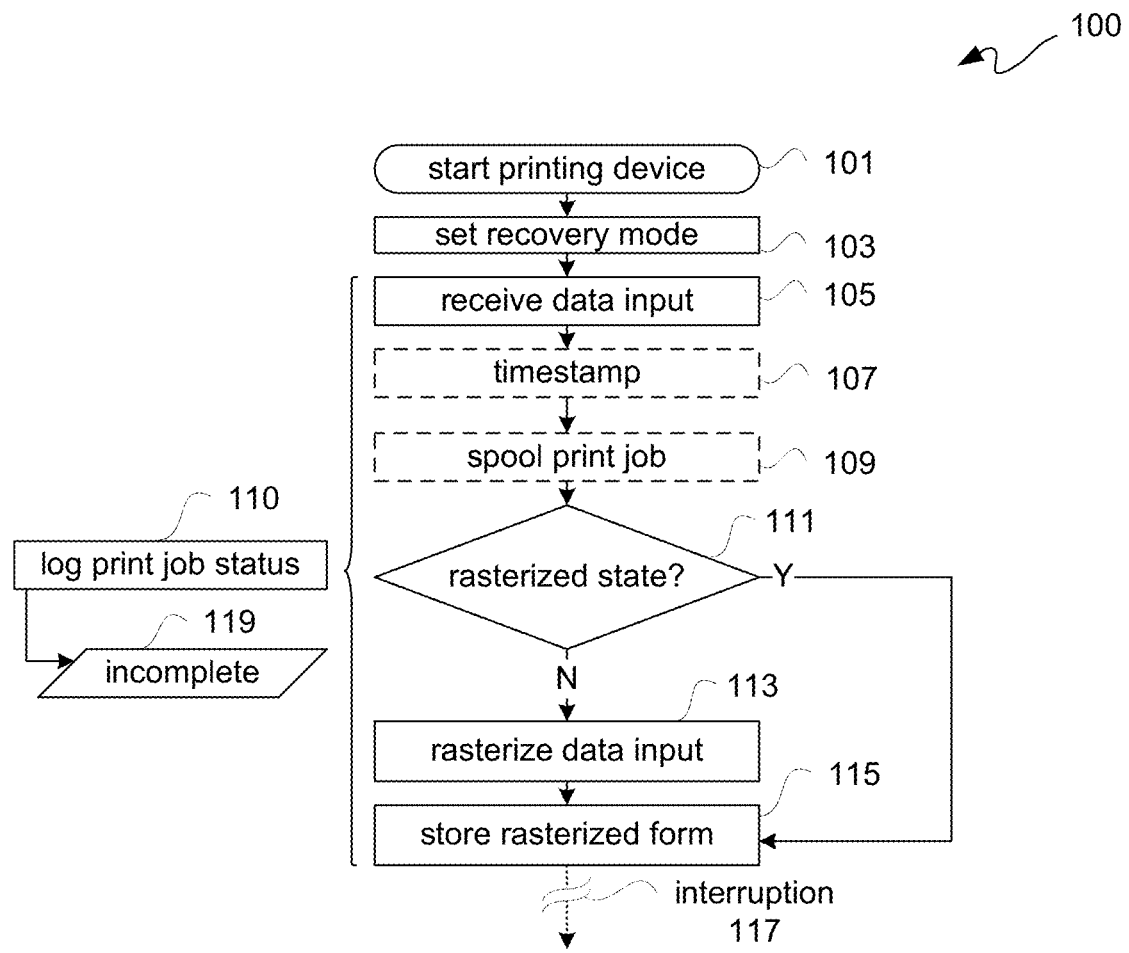
FIG. 1 is a flow diagram depicting an example of a printing device operations flow.

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Exemplary apparatus(es) and/or method(s) are described herein. It should be understood that the word "exemplary" is used herein to mean "serving as an example, instance, or illustration." Any example or feature described herein as "exemplary" is not necessarily to be construed as preferred or advantageous over other examples or features.

Before describing the examples illustratively depicted in the several figures, a general introduction is provided to further understanding.

When a printing device, such as a multi-function printer ("MFP") for example, receives a request, it may have to modify/edit input data in order to be able to generate a requested output. Along those lines, processing of a job can be broken down into three main stages for job management of an MFP processing pipeline, namely data input management, data edit management, and data output management.

For data input management, an MFP may have several different input ports, virtual and/or physical, for receiving data. Each port may have a separate sub-process assigned to it to cover each supported input type. For example, a user may scan a document, or a faxed document may be received. For a print job, such print job may be received from a computer, phone, notebook, or other electronic device. This generally means pages are described in one of a variety of Page Description Languages ("PDLs"), though in another instance such pages can be simple raster pages.

An MFP converts input pages of input data to a raster format, if they are not received in a rasterized format, and then stores them generally before any further processing. Such storage can be in: random access memory ("RAM") or other solid-state high-speed memory when such document is printed right away, for example when high performance is important; permanent or non-volatile storage, such as in an internal hard-drive ("HDD") or solid-state drive ("SSD") for example. Some of this data may be kept in background storage only temporarily, but some of this data may be stored for a longer term. Information about jobs may be stored in a jobs log ("log").

A data edit management stage may provide one or more modifications to input data received and stored by a data input management operation. Data edit management stage and downstream processing within a printing device is generally considered post-processing of an in-process job. Some data edits may be used to be able to generate a proper output for a received input. These can include one or more of: scaling of an input document; adjusting color density of an input image; and/or creation of a scaled-down or thumbnail version of an input document. A data edit management stage generally generates output data that is sometimes kept in temporary memory, but sometimes may be stored longer term on an internal storage drive.

A data output management stage generally uses an end-product of a data edit management stage and outputs generated images thereof. For an MFP, different types of outputs are supported. Along those lines, a generated document can be printed or sent via fax or email. Moreover, a generated document or portion thereof may be passed to some internal components of an MFP. An example may include passing a thumbnail or preview version to a control panel, which might display such an image of input data.

As described below in additional detail, when processing an input document, such document may be stored on an internal drive of an MFP for background storage, and an interim result of post-processing of such document may be stored in temporary storage.

If something fatally interrupts processing during editing or after editing and prior to completing output, namely an in-process document in a post-processing chain, such stored job may be marked as incomplete or similar state in a log to indicate such job was not processed successfully. In the past, a user had to restart an MFP, and in such process lost any in-process job data, such as for example a partially finished output like a partially finished preview image would be deleted during such restart. However, as described below in additional detail, existing logging information and stored input data may be used to determine if post-processing was interrupted, and then such job may be completed using available information without having to completely start over as in the past. More particularly, as described below in additional detail post-processing refers to processing after input data is completely stored in storage of a printing device in a rasterized form, whether converted to such form or received in such form.

For example, suppose a user scans a document on an MFP, such scanned document is stored in MFP internal storage. Suppose further that as part of a data edit management stage, software starts to generate thumbnail versions of document pages, but during that operation a power outage interrupts such thumbnail processing. As described below, when such MFP is restarted, such as in this example by power coming back on for example, MFP system software checks a log to determine if any of recently stored jobs are in an incomplete state. If system software finds any such incomplete jobs, system software checks to determine if such interruption occurred after input data had been successfully received and stored for subsequent post-processing, and so only post-processing was interrupted. If one or more stored job files are found with such condition, system software can restart original post-processing operations without completely restarting from receiving a job for processing. Again, an example of starting from a post-processing beginning may be generating a preview for scanned pages anew using stored input data.

With the above general understanding borne in mind, various configurations for printing device recovery systems and methods are generally described below.

Reference will now be made in detail to examples which are illustrated in the accompanying drawings. In the following detailed description, numerous specific details are set forth in order to provide a thorough understanding of the following described implementation examples. It should be apparent, however, to one skilled in the art, that the implementation examples described below may be practiced without all the specific details given below. Moreover, the example implementations are not intended to be exhaustive or to limit scope of this disclosure to the precise forms disclosed, and modifications and variations are possible in light of the following teachings or may be acquired from practicing one or more of the teachings hereof. The implementation examples were chosen and described in order to best explain principles and practical applications of the teachings hereof to enable others skilled in the art to utilize one or more of such teachings in various implementation examples and with various modifications as are suited to the particular use contemplated. In other instances, well-known methods, procedures, components, circuits, and/or networks have not been described in detail so as not to unnecessarily obscure the described implementation examples.

For purposes of explanation, specific nomenclature is set forth to provide a thorough understanding of the various concepts disclosed herein. However, the terminology used herein is for the purpose of describing particular examples only and is not intended to be limiting. As used herein, the singular forms "a", "an" and "the" are intended to include the plural forms as well, unless the context clearly indicates otherwise. As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. It will also be understood that the term "and/or" as used herein refers to and encompasses any and all possible combinations of one or more of the associated listed items. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof. It will also be understood that, although the terms first, second, etc. may be used herein to describe various elements, these elements should not be limited by these terms, as these terms are only used to distinguish one element from another.

Some portions of the detailed descriptions that follow are presented in terms of algorithms and symbolic representations of operations on data bits, including within a register or a memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those involving physical manipulations of physical quantities. Usually, though not necessarily, these quantities take the form of optical, electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers or memories into other data similarly represented as physical quantities within the computer system memories or registers or other such information storage, transmission or display devices.

Concepts described herein may be embodied as apparatus, method, system, or computer program product. Accordingly, one or more of such implementation examples may take the form of an entirely hardware implementation example, an entirely software implementation example (including firmware, resident software, and micro-code, among others) or an implementation example combining software and hardware, and for clarity any and all of these implementation examples may generally be referred to herein as a "circuit," "module," "system," or other suitable terms. Furthermore, such implementation examples may be of the form of a computer program product on a computer-usable storage medium having computer-usable program code in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CD-ROM"), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency ("RF") or other means. For purposes of clarity by way of example and not limitation, the latter types of media are generally referred to as transitory signal bearing media, and the former types of media are generally referred to as non-transitory signal bearing media.

Computer program code for carrying out operations in accordance with concepts described herein may be written in an object oriented programming language such as Java, Smalltalk, C++ or the like. However, the computer program code for carrying out such operations may be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network ("LAN") or a wide area network ("WAN"), or the connection may be made to an external computer (for example, through the Internet using an Internet Service Provider).

Systems and methods described herein may relate to an apparatus for performing the operations associated therewith. This apparatus may be specially constructed for the purposes identified, or it may include a general-purpose computer selectively activated or reconfigured by a computer program stored in the computer.

Notwithstanding, the algorithms and displays presented herein are not inherently related to any particular computer or other apparatus. Various general-purpose systems may be used with programs in accordance with the teachings herein, or it may prove convenient to construct a more specialized apparatus to perform the operations. In addition, even if the following description is with reference to a programming language, it should be appreciated that any of a variety of programming languages may be used to implement the teachings as described herein.

One or more examples are described below with reference to flowchart illustrations and/or block diagrams of methods, apparatus (including systems) and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the Figures illustrate the architecture, functionality, and operation of possible implementations of apparatuses (including systems), methods and computer program products according to various implementation examples. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

It should be understood that although the flow charts provided herein show a specific order of operations, it is understood that the order of these operations may differ from what is depicted. Also two or more operations may be performed concurrently or with partial concurrence. Such variation will depend on the software and hardware systems chosen and on designer choice. It is understood that all such variations are within the scope of the disclosure. Likewise, software and web implementations may be accomplished with standard programming techniques with rule based logic and other logic to accomplish the various database searching operations, correlation operations, comparison operations and decision operations. It should also be understood that the word "component" as used herein is intended to encompass implementations using one or more lines of software code, and/or hardware implementations, and/or equipment for receiving manual inputs.

Figures 1, 4:
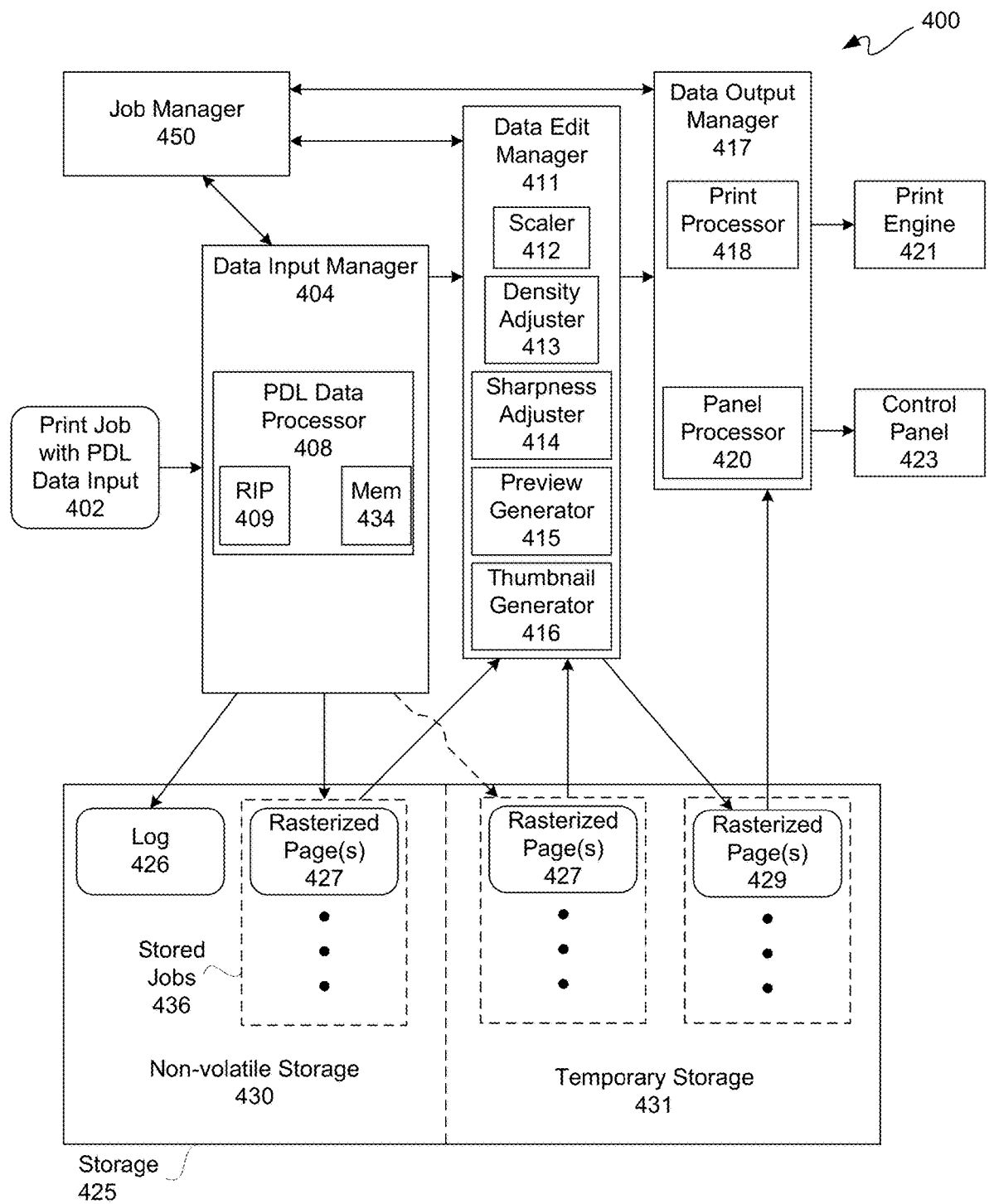
Figures 2, 4:
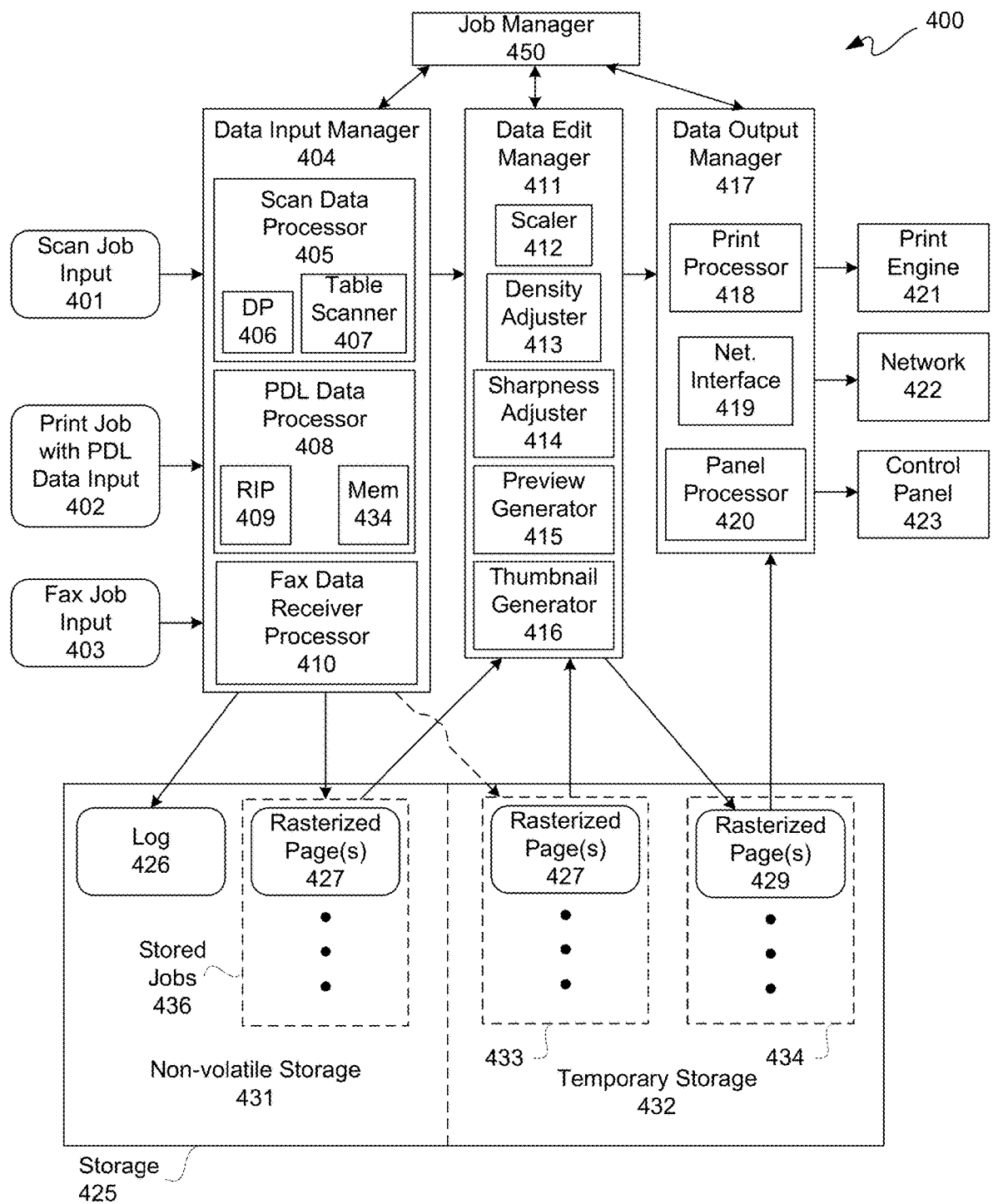

FIG. 1 is a flow diagram depicting an example of a printing device operations flow 100. FIG. 4-1 is a block diagram depicting an example of a printing device 400 in an operations mode. In this example, printing device 400 is a dedicated printer; however, in another example printing device 400 may be a multi-function printer ("MFP"), examples of which are described below. With simultaneous reference to FIGS. 1 and 4-1 printing device operations flow 100 and printing device 400 are further described.

At operation 101, a printing device 400 may be started. At operation 103, a recovery mode for such printing device 400 may be set in a controller, such as a job manager 450. As described below in additional detail, a recovery mode set to an active stage may be triggered by printing device 400 being turned on or power cycled, such as part of a power on system initialization sequence. However, in other examples, a recovery mode set to an active state may be invoked without power cycling or rebooting printing device 400. For example, post-processing may be interrupted or prevented by some sort of system issue which might not involve cycling power or rebooting to clear. For example, due to a number of stored jobs, there may be insufficient free space on an internal hard drive of printing device 400, which may cause a post-processing interruption. In another example, a low internal memory situation may temporarily prevent a data edit manager 411 from performing post-processing, such as generating a preview for example.

Along those lines, a setting of a recovery mode to an active state may include a manual intervention causing a triggering of such a recovery mode. For example, a user may delete one or more stored jobs through a control panel user interface to free up hard drive space, and in response trigger recovery through a control panel user interface without power cycling or rebooting printing device 400. Another example for a recovery mode active setting may be an automated recovery. For example, if one or more print jobs have an incomplete state, printing device 400 may be set to automatically attempt recovery after a certain timeout expires, for example a recovery attempt may be periodically performed every so often (e.g., every 15 minutes until cleared). Again, an automated recovery as in this example may occur without power cycling or rebooting printing device 400.

At operation 105, data input for a print job 402 may be received by a data input manager 404 of printing device 400. Such received data input may be in a page description language or PDL, namely PDL data input for a print job 402.

Data input manager 404 may be implemented in a combination of hardware and software under control of a job manager 450, which is described below in additional detail. In this example, data input manager 404 includes a PDL data processor 408, which includes a raster image processor or RIP 409. In this example, PDL data processor 408 is generally implemented in software though interfacing may be in hardware, and RIP 409 is generally implemented in firmware; however, other software and hardware combinations may be used.

At optional operation 107, PDL data processor 408 may be configured to timestamp a receipt time for a received print job 402. While operations of printing device 400 may be under direct or indirect control of job manager 450, generally operations are described as being carried out by functions associated with more direct execution of such operations for purposes of clarity and not limitation.

At optional operation 109, each received print job 402 may be queued or spooled by data input manager 404. Data input manager 404 may include buffer memory 434 of or in communication with PDL data processor 408 for such spooling.

At operation 111, a check may be performed to determine whether received data input from a job is in a rasterized state or not. Operation 111 may be omitted for a dedicated printer for printing device 400, but may be present anyway, as an MFP for printing device 400 may use operation 111.

If received data input for a job is determined not to be in a rasterized format at operation 111, such as in this example a print job 402 in a PDL format such as XPS, PCL5, PCL6, PDF, PostScript, among others, then such data input may be rasterized at operation 113. Rasterization at operation 113 may be performed using RIP 409.

After rasterization at operation 113, such data input in a rasterized form may be stored in storage of printing device 400 at operation 115. In this example, one or more rasterized page(s) (hereinafter collectively and singly "rasterized pages") 427 obtained by rasterizing data input for print job 402 are stored in a non-volatile device ("non-volatile") storage 430, which may be part of a general storage 425 of printing device 400. Storage 425 for example may include for example one or more SSDs, HDDs, or a combination thereof. For SSDs, such non-volatile storage 430 may include flash memory and/or phase-change memory; however, in another example, battery-backed memory may be used.

If received data input for a job is determined to be in a rasterized format at operation 111, then such rasterized pages 427 for data input in a rasterized form may be directly stored in non-volatile storage 430 at operation 115, as previously described. Such rasterized and stored data input may be recovered from non-volatile storage 430 after a reboot of printing device 400 for a restart of a job, such as a print job 402 for example. Optionally, rasterized pages 427 may be also stored in temporary storage 431 for more immediate access by data edit manager 411.

Even though single instances of stored jobs are generally described for purposes of clarity, there may be multiple jobs stored in either or both non-volatile storage 430 and/or temporary storage 431. For example, there may be multiple stored jobs 436 each having one or more rasterized pages 427 per job in non-volatile storage 430.

During one or more of operations 105, a log 426, which may be maintained in non-volatile storage 425, may be updated to log a status of print job 402 as generally indicated as operation 110. Logging at operation 110 may include indicating an incomplete state 119 in association with status of print job 402.

Even though printing device operations flow 100 is generally described for a single print job 402, such flow may be used by printing device 400 to receive multiple print jobs 402, which optionally may be spooled. Such one or more print jobs 402 may have their respective data input rasterized and stored as rasterized pages 427, as applicable, in non-volatile storage 430, where each such set of rasterized pages 427 may have associated therewith an incomplete state 119 as a status in log 426.

During printing device operations flow 100, printing device 400 may experience an interruption 117. There are different types of interruptions that may occur for which a recovery procedure as described herein may be invoked, including without limitation a power outage, insufficient internal memory, or insufficient hard drive or other storage memory for example. With respect to a power outage example, printing device 400 may have internal non-volatile storage 430, and so stored input data may survive such an interruption 117. However, a received print job 402 might not be printed immediately after being successfully received, rasterized, and stored. For example, after storing, a data edit manager 411 may perform one or more additional operations on one or more pages of rasterized pages 427.

In this example, data edit manager 411 is generally implemented in software though interfacing may be in hardware, and modules of data edit manager 411 are generally implemented in firmware; however, other software and hardware combinations may be used. Data edit manager 411 in this example includes a scaler 412, a density adjuster 413, a sharpness adjuster 414, a preview generator 415, and a thumbnail generator 416, all of which are well known and thus not described in detail for purposes of clarity and not limitation.

In this example, data output manager 417 is generally implemented in software though interfacing may be in hardware, and modules of data output manager 417 are generally implemented in firmware; however, other software and hardware combinations may be used. Data output manager 417 in this example includes a print processor 418 and a panel processor 420, both of which are well known and thus not described in detail for purposes of clarity and not limitation.

During normal operating conditions, rasterized pages 427 may be obtained from non-volatile storage 430 by data edit manager 411, and data edit manager 411 edited rasterized page(s) (hereinafter collectively and singly "rasterized pages") 429 may be stored in temporary storage 431 of storage 425. Temporary storage 431 may be volatile storage, such as cache memory for example. Edited rasterized pages 429 may be obtained from temporary storage 431 by data output manager 417. Print processor 418 may provide a print ready version of rasterized pages 429 to a print engine 421 for printing. Panel processor 420 may provide a thumbnail or preview control panel version of rasterized pages 429 to control panel 423.

An arrow between data input manager 404 and data edit manager 411 generally indicates a first controlled handoff of a job from one manager to another. Along those lines, an arrow between data edit manager 411 and data output manager 417 generally indicates a second controlled handoff of such a job from one manager to another. Coordination of processing of jobs by and between managers 404, 411, and 417 may be provided by a job manager 450.

In this example, job manager 450, which is implemented in software and hardware, coordinates operations of managers 404, 411, and 417. This coordination may be in a known manner, except for an addition of a recovery mode including associated operations thereof, which may be invoked as described below in additional detail. Job manager 450 may be thought of as a controller, which controls data flow through a printing device pipeline formed of managers 404, 411, and 417, which managers have access to storage 425 for storing data and information as described herein.

An example of an operation on one or more pages of stored rasterized pages 427 may be for data edit manager 411 to create a scaled-down thumbnail version of such one or more pages to display on a control panel of printing device 400. Along those lines, data edit manager 411 may retrieve a rasterized page 427 from storage 430 or optionally 431 and processes same using thumbnail generator 416 for example; however, there may be some sort of interruption, such as a power outage for example, during this processing step. After starting up printing device again or otherwise clearing a cause of an interruption, a recovery mode set at operation 103 may be invoked. A recovery mode as described below in additional detail may save a user from having to regenerate an original input again in order to rasterize and store it in order to have printing device generate a thumbnail image for such job.

As described below in additional detail, a printing device's log system and already stored rasterized input data can be used to finish an interrupted processing without having to completely restart a job. So for example, stored input data may be found, and a preview image, a thumbnail image, or other editing by data edit manager 411 may be performed using recovered stored rasterized input data.

Figures 1, 2:
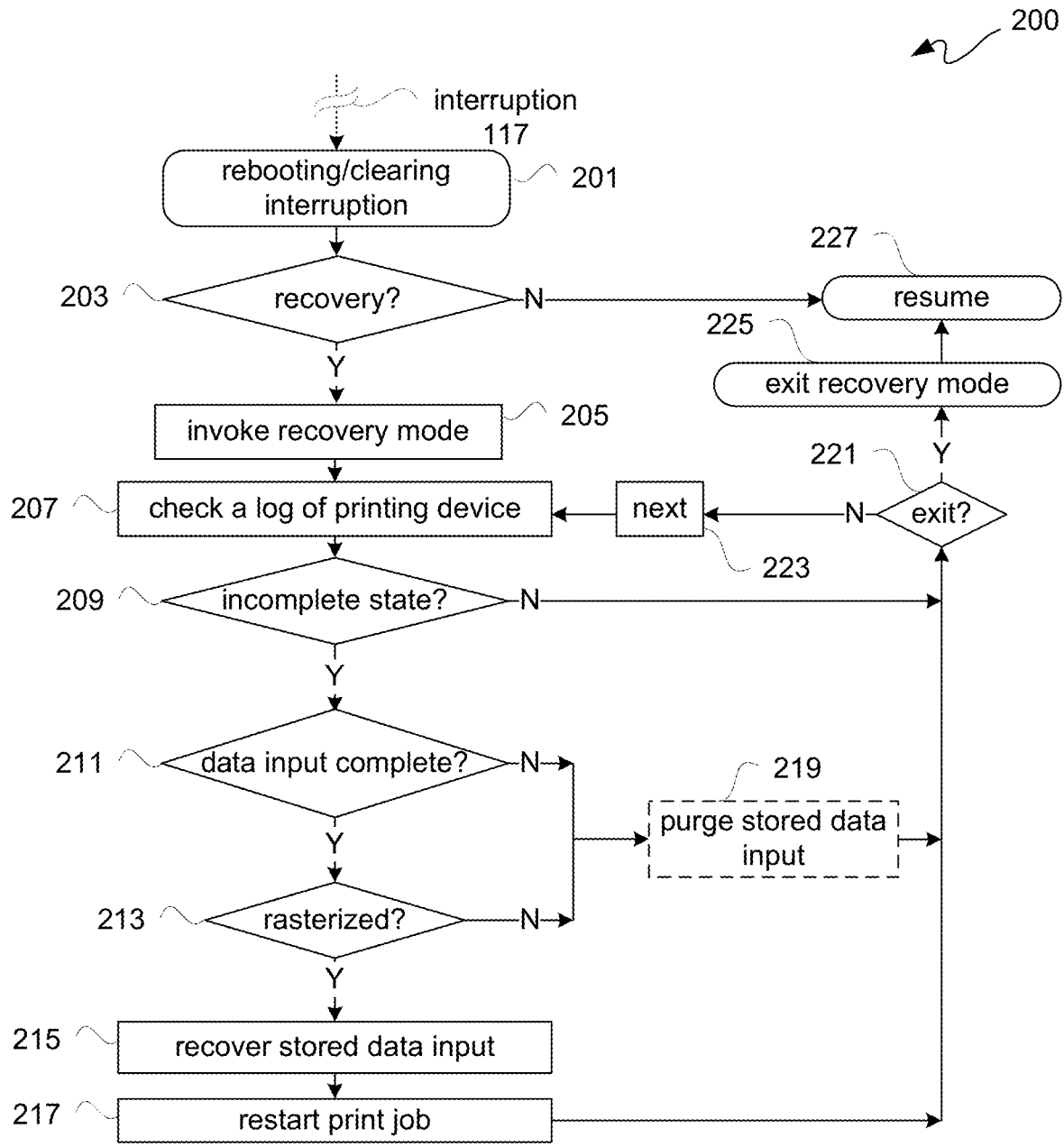
Figure 2:
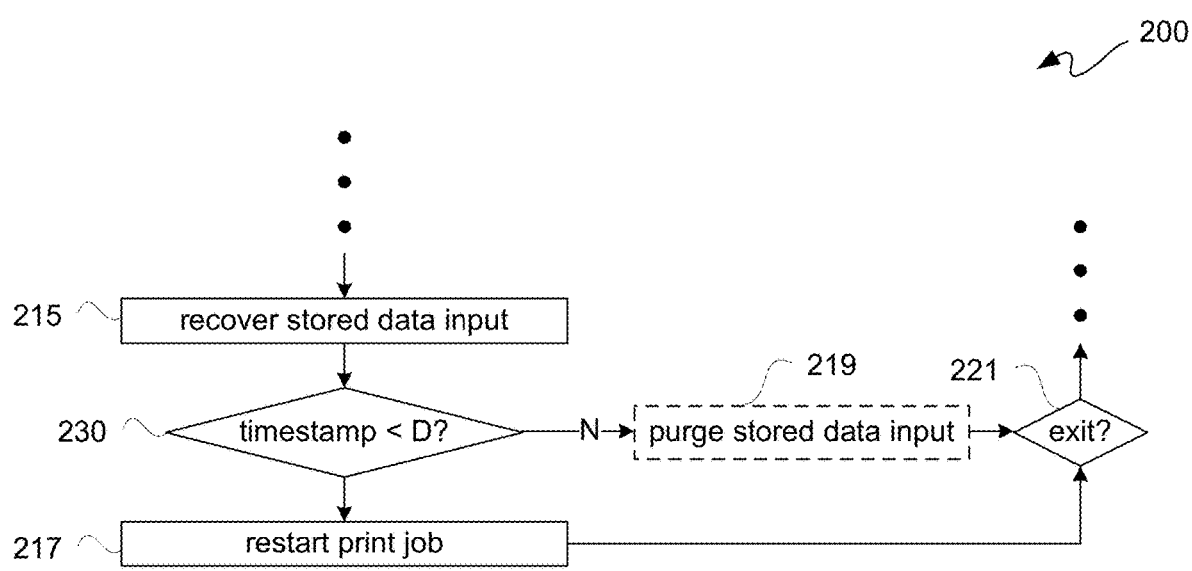
Figures 1, 5:
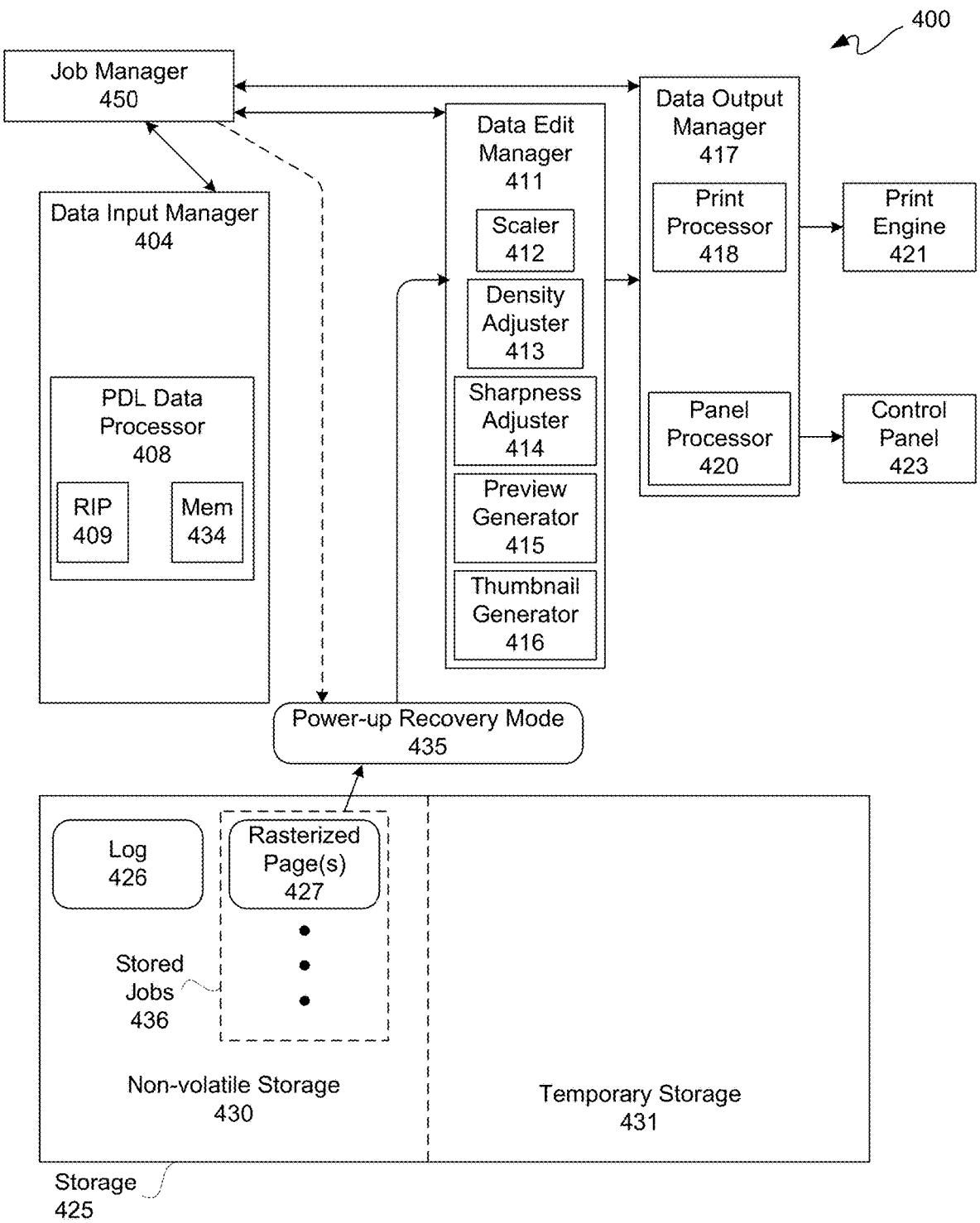
Figures 2, 5:
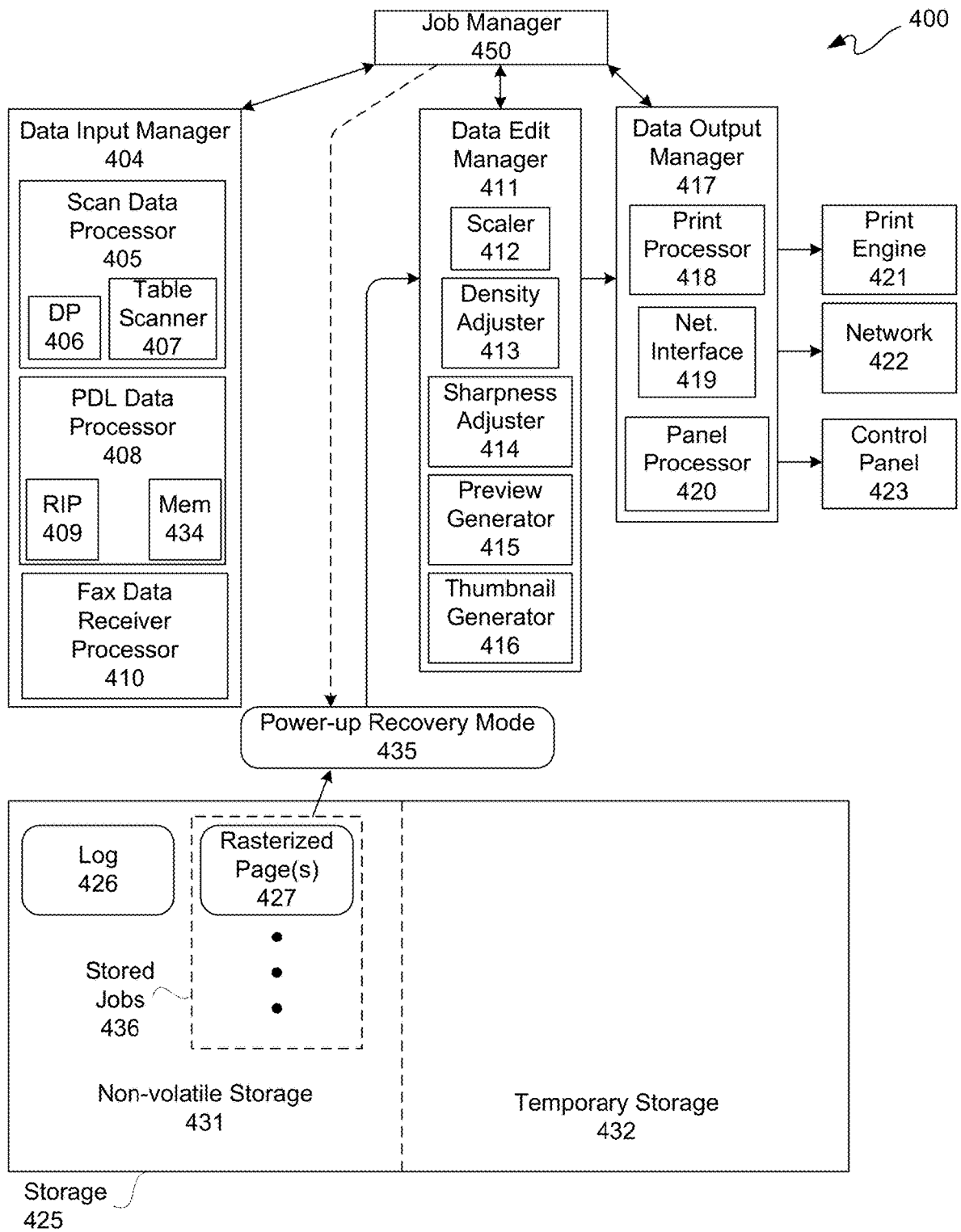

Referring now to FIG. 2-1, where there is shown a flow diagram depicting an example of a printing device recovery operations flow 200. FIG. 5-1 is a block diagram depicting an example of a printing device 400 of FIG. 4-1 in an operational state of a recovery mode after an interruption in service. In this example, printing device 400 is a dedicated printer; however, in another example printing device 400 may be a multi-function printer ("MFP"), examples of which are described below. With simultaneous reference to FIGS. 2-1, 4-1 and 5-1 printing device recovery operations flow 200 and printing device 400 are further described.

After an interruption, printing device 400 may for example be rebooted or power cycled or have internal memory or storage made available at operation 201 in order to clear such interruption. At operation 203, a check may be made to determine if at least one recovery mode was set. In another example, one or more recovery modes may be set as a default setting or default settings.

If a recovery mode was not set as determined at operation 203, then normal printing operations may resume at 227. If, however, a recovery mode was set as determined at operation 203 for a type of interruption 117, then job manager 450 may invoke a recovery mode at operation 205 for such an interruption, such as part of a power-up sequence or other interruption clearing sequence. However, for purposes of clarity by way of example and not limitation, an interruption 117 is assumed to be for a loss of power though one or more other types of interruptions may be handled by recovery operations as described herein.

In an operational recovery state, any data in volatile temporary storage 431 may have been lost, and rasterized pages 427 data of one or more stored jobs 436 may be retained along with information in log 426 in non-volatile storage 430. Along those lines, job manager 450 may invoke a recovery mode 435 as part of a power-up sequence.

At operation 207, a check of a log 426 associated with printing device 400 may be performed. From such check at operation 207, at operation 209 it may be determined whether there is at least one print job 402 having an incomplete state 119 for a status thereof in log 426. Though the example of a single print job is generally described in detail herein, more than one job may be listed in log 426, and more than one of such listed jobs in log 426 may have an incomplete state 119 listed therefor.

For such at least one print job 402 not having an incomplete as determined at operation 209, it may be determined whether or not to exit a recovery mode at operation 221. At operation 221, it may be determined whether at least one other print job in log 426 is yet to be processed for an incomplete state. If at least one other print job is to be processed as determined at operation 221, then at operation 223 a next print job may be obtained. If, however, there is no other print job to be processed in log 426 as determined at operation 221, then at operation 225 a recovery mode may be exited and at operation 227 normal printing status may be resumed or entered.

In an example, each entry in log 426 may be cycled through one-by-one until all entries in log 426 have been check for an incomplete state at operation 209. However, in another example, a check at operation 207 may be used to identify any and all incomplete states, and then just process each of those identified entries one-by-one. In such other example, operation 209 may be built into operation 207.

For a print job having an incomplete state 119 as determined at operation 209, at operation 211 it may be determined whether data input for such at least one print job 402 is for a completely received and fully stored version thereof in non-volatile storage 430 of printing device 400 including in a rasterized form. In this example, a separate operation 213 for determining whether stored data input is in a rasterized form for purposes of clarity and not limitation, as operations 211 and 213 may be combined into a single operation 211.

If data input is not complete or not rasterized as determined at operations 211 and 213, respectively, in this example, then optionally such data input may be purged from non-volatile storage 430 at operation 219. After purging, a check at operation 211 may be performed as previously described.

If, however, data input is complete and rasterized as determined at operations 211 and 213, respectively, in this example, then a recovery operation 215 for such completely rasterized and completely stored data input may be performed. Such recovery operation may include a read out of such completely rasterized and completely stored data input from non-volatile storage 430. Such read out data input may be provided to data edit manager 411, and at operation 217 a print job may be restarted using data input recovered from storage for processing by data edit manager 411. This restart however is not from the beginning as in the past; rather, a restart is after data input is completely stored in a rasterized form, and so such restart is only for post-processing, which may or may not have been previously been done in part prior to service interruption and prior to completing an output for such job. In this example, post-processing as used herein generally means any and all processing performed after a job has been completely stored in a rasterized form in non-volatile storage 430.

After such processing by data edit manager 411 may be provided as rasterized pages 429 for obtaining by data output manager 417, as previously described. After restarting operation 217, exit operation 221 may be performed as previously described.

Referring now to FIG. 2-2, where there is shown a flow diagram depicting an example of another printing device recovery operations flow 200. With simultaneous reference to FIGS. 1, 2-1, 2-2, 4-1, and 4-2 printing device recovery operations flow 200 and printing device 400 are further described.

In this example, PDL data processor 408 is configured to timestamp at optional operation 107 each print job received. Such timestamp is logged at operation 110 with each associated print job in log 426. Along those lines, printing device recovery operations flows 200 of FIGS. 2-1 and 2-2 are the same, except for an additional check of log 426 at operation 230 for a timestamp being less than a threshold delay ("D").

In other words, at operation 230 timestamp may be checked to determine whether less than a threshold amount of delay has passed since an associated print job was received by printing device 400. Responsive to a delay being less than a threshold amount D, restarting of a print job may be initiated at operation 217 using data input recovered from non-volatile storage 430, as previously described. Along those lines, a maximum timespan may be a set parameter, so recovery is only attempted when by less time and/or by date has passed since the reception of a stored job.

If, however, delay is not less than a threshold amount D, then optionally at operation 219 such stored data input may be purged, as previously described. In another example where data input is not purged, such data input may remain accessible until written-over. From operation 219 or 217, an exit operation 221 may be performed as previously described.

Figure 3:
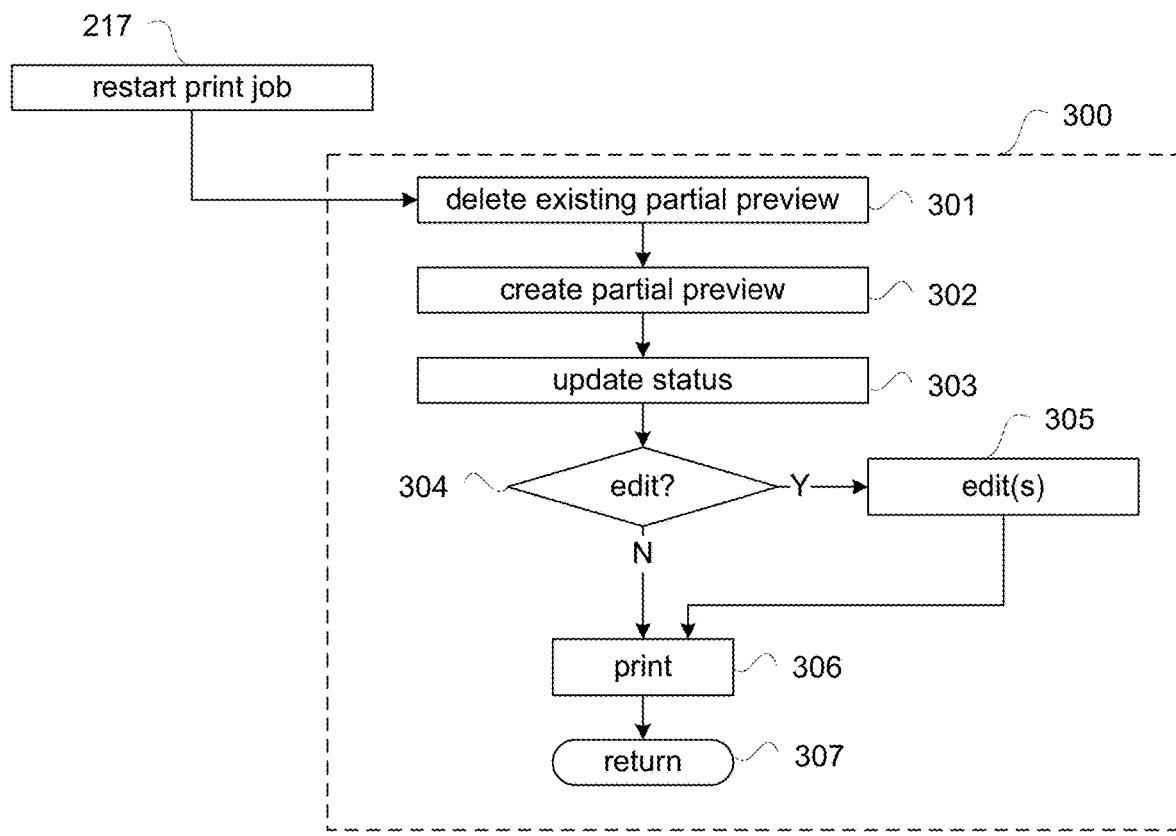
FIG. 3 is a flow diagram depicting an example of restart operations flow.

Referring now to FIG. 3, where there is shown a flow diagram depicting an example of restart operations flow 300.

With simultaneous reference to FIGS. 1 through 4-1 and 5-1, restart operations flow 300 for printing device 400 is described.

Restart operations flow 300 may proceed as part of or responsive to a restart print job operation 217. Along those lines, a restart operations flow 300 may proceed in parallel with checking for another print job to process in a recovery mode as part of a printing device operations flow 200. However, in another example, restart operations flow 300 may be part of restart print job operation 217 and executed therewithin.

At operation 301 of operations 301 through 307 of operation flow 300, an existing partial preview for a completely rasterized and stored print job may be deleted. At operation 302, a partial preview for such print job may be created anew using at least a portion of such data input recovered from non-volatile storage 430.

At operation 303, a status for such print job in log 426 may be updated from an incomplete state to a recovered state in such log. At operation 304, it may be determined what, if any, edits are to be performed on such print job by data edit manager 411. For one or more edits to be performed as determined at operation 304, such print job recovered data input may have such edits performed and incorporated at operation 305 by data edit manager 411. If there is no editing to be performed as determined at operation 304, or if any and all edits were performed at operation 305, then at operation 306 such an in-process print job may be output for printing and printed.

Such edited or unedited print job, as applicable, may be printed at printing operation 306 by providing from temporary storage rasterized pages 429 to data output manager 417 for a print processor 418. Print processor 418 processes such rasterized pages 429 for print engine 421 of printing device 400.

While the above description has generally been mainly for a dedicated printer for printing device 400, in another example printing device 400 may be an MFP. Referring now to FIG. 4-2, where there is shown a block diagram depicting an example of an MFP printing device 400 in an operations mode. With simultaneous reference to FIGS. 1 through 4-2, MFP printing device 400 of FIG. 4-2 is further described. However, as much of the description for an MFP printing device 400 is the same as that for a previously described dedicated printer version of a printing device 400, such description is generally not repeated for purposes of clarity and not limitation.

Data input for at least one print job may be for a scan job input ("scan job") 401, a print job 402, a fax job input ("fax job") 403. Along those lines, a job may be a scan job, a fax job, or a print job, and accordingly, data input manager 404 may select from a scan input, a PDL input, or a fax input for printing device 400 being an MFP.

In this example, data input manager 404 further includes a scan data processor 405 and a fax data receiver processor 410. Scan data processor 405 may include a data processor 406 and a table scanner 407. As fax data receiver processor 410 and scan data processor 405 are well known components of a data input manager, such well known components are not described in unnecessary detail for purposes of clarity.

A scan or fax input for a scan job 401 or a fax job 403, respectively, may generally be in a rasterized state for storing as rasterized pages 427. Each scan or fax job may be logged in log 426 with an incomplete state, as previously described.

Such scan or fax job may generally be processed like a print job, as previously described. However, a scan or fax job may or may not be printed by an MFP printing device 400 in contrast to a print job. For a scan or fax job to be sent over a network to another destination, a network interface 419 may be included in data output manager, as is known, for communication with a network 422. In another example, an MFP printing device 400 may send a print job via network 422 to a different printing device for printing.

For purposes of clarity and not limitation, FIG. 5-2 is the block diagram of FIG. 4-2 for an MFP printing device 400 though in an operational state of a recovery mode after an interruption in service. Again, in such state, any data in volatile temporary storage 431 may have been lost, and rasterized pages 427 data of one or more stored jobs 436 may be retained along with information in log 426 in non-volatile storage 430.

Again, if a recovery mode 435 was not set as determined at operation 203, then normal printing operations may resume at 227. If, however, a recovery mode 435 was set as determined at operation 203, then job manager 450 may invoke such a recovery mode 435 at operation 205, such as part of a power-up sequence.

Because one or more of the examples described herein may be implemented in using a network, such as for a cloud-based SaaS implementation, or a computing system, as well as a mobile device and an MFP, a detailed description of examples of each is provided. However, it should be understood that other configurations of one or more of these examples may benefit from the technology described herein.

Figure 6:
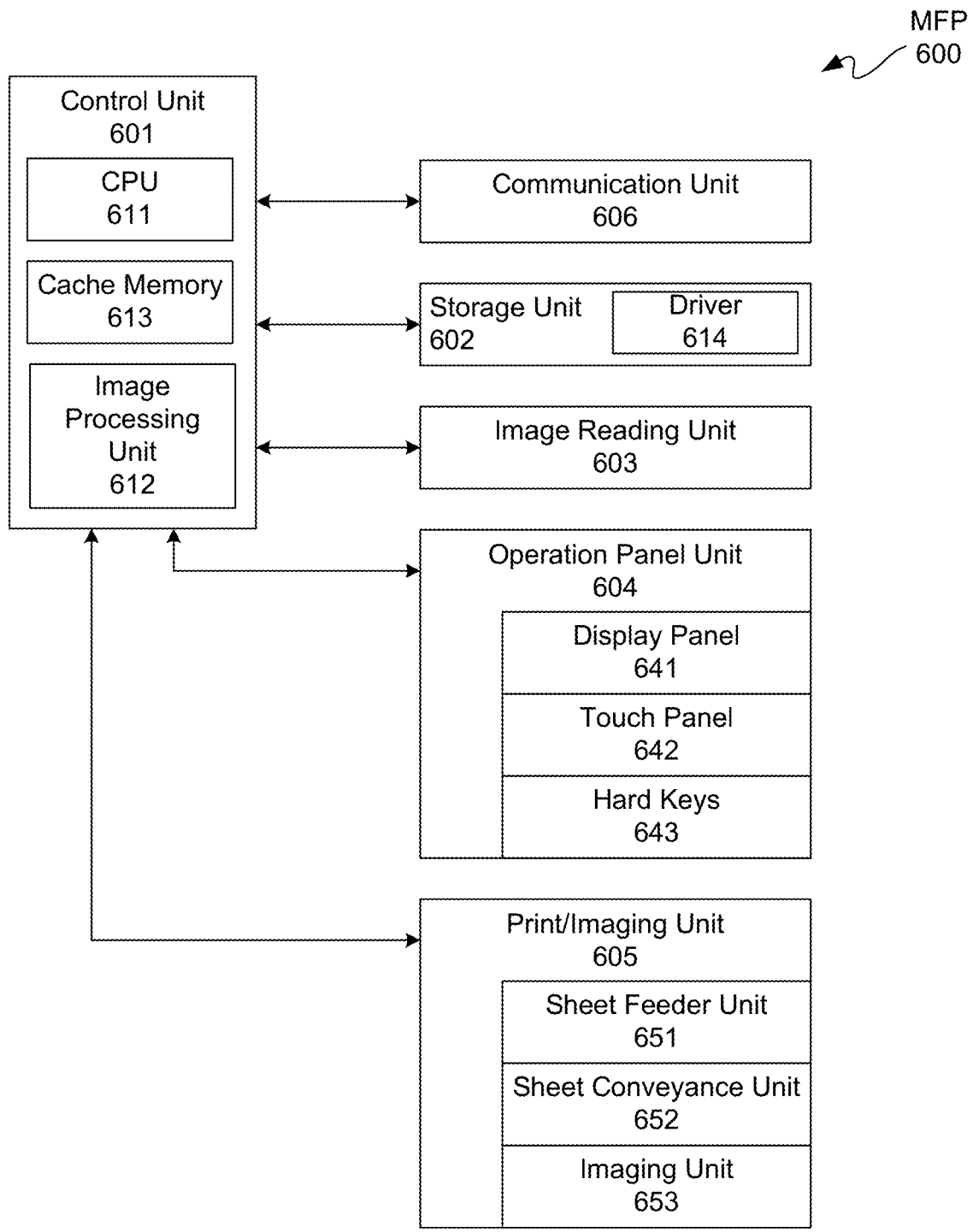
FIG. 6 is a block diagram depicting an example of a multi-function printer.

FIG. 6 is a block diagram depicting an example of an MFP 600. MFP 600 is provided for purposes of clarity by way of non-limiting example.

MFP 600 includes a control unit 601, a storage unit 602, an image reading unit 603, an operation panel unit 604, a print/imaging unit 605, and a communication unit 606. Communication unit 606 may be coupled to a network for communication with other peripherals, mobile devices, computers, servers, and/or other electronic devices.

Control unit 601 may include a CPU 611, an image processing unit 612, and cache memory 613. Storage unit 602 may include ROM, RAM, and large capacity storage memory, such as for example an HDD or an SSD. Storage unit 602 may store various types of data and control programs, including without limitation a printer driver 614. In another example, control unit 601, or one or more components thereof, may be housed or located separately from MFP 600.

Operation panel unit 604 may include a display panel 641, a touch panel 642, and hard keys 643. Print/imaging unit 605 may include a sheet feeder unit 651, a sheet conveyance unit 652, and an imaging unit 653.

Generally, for example, for an MFP a copy image processing unit, a scanner image processing unit, and a printer image processing unit may all be coupled to respective direct memory access controllers for communication with a memory controller for communication with MFP memory or storage. Many known details regarding MFP 600 are not described for purposes of clarity and not limitation.

Figure 7:
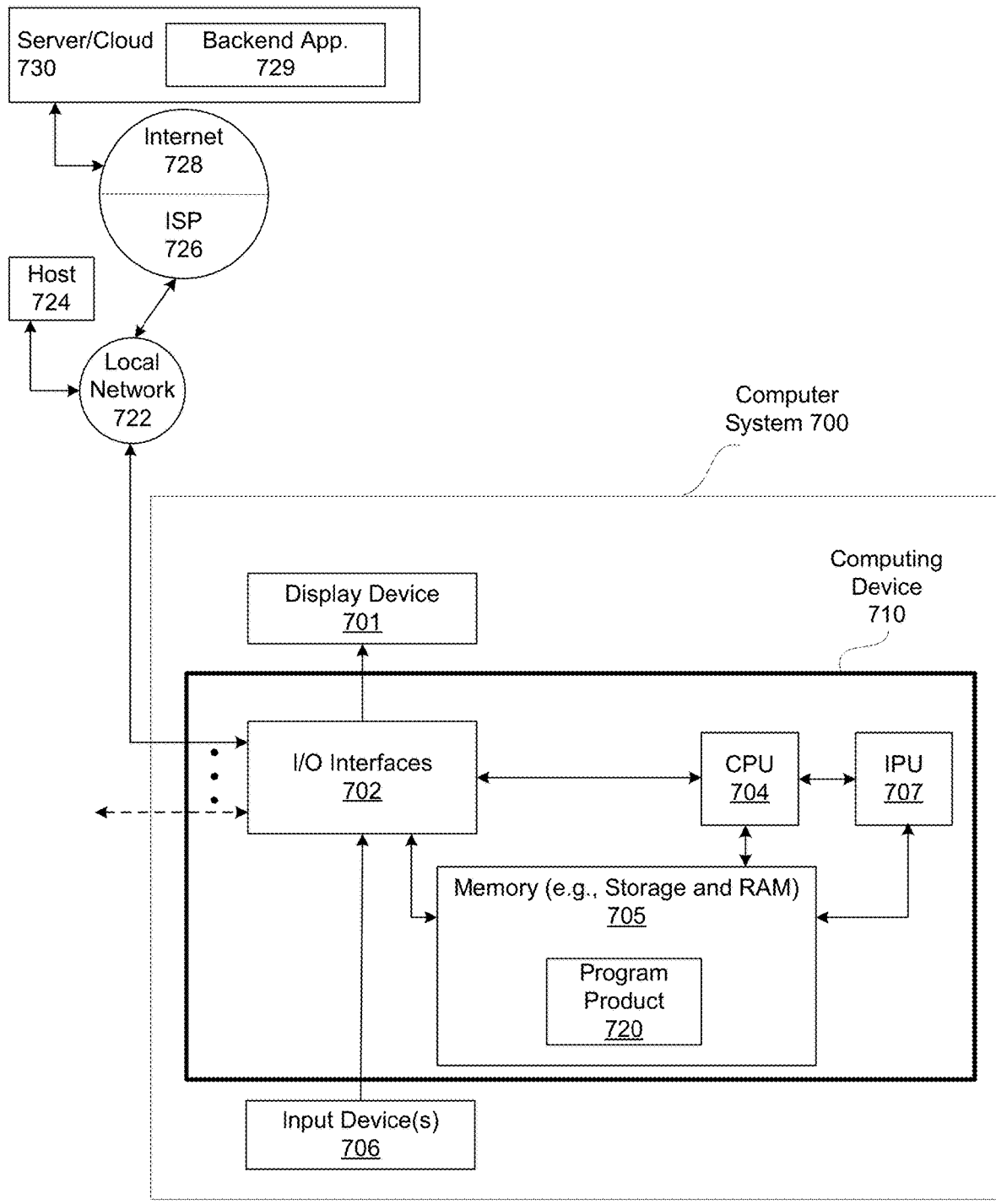
FIG. 7 is a block diagram depicting an example of a computer system.

FIG. 7 is a block diagram depicting an example of a computer system or MFP computing system 700 ("computer system 700") upon which one or more aspects described herein may be implemented. Computer system 700 may include a programmed computing device 710 coupled to one or more display devices 701, such as Cathode Ray Tube ("CRT") displays, plasma displays, Liquid Crystal Displays ("LCDs"), Light Emitting Diode ("LED") displays, light emitting polymer displays ("LPDs") projectors and to one or more input devices 706, such as a keyboard and a cursor pointing device. Other known configurations of a computer system may be used. Computer system 700 by itself or networked with one or more other computer systems 700 may provide an information handling system.

Programmed computing device 710 may be programmed with a suitable operating system, which may include Mac OS, Java Virtual Machine, Real-Time OS Linux, Solaris, iOS, Darwin, Android Linux-based OS, Linux, OS-X, UNIX, or a Windows operating system, among other platforms, including without limitation an embedded operating system, such as VxWorks. Programmed computing device 710 includes a central processing unit ("CPU") 704, one or more memories and/or storage devices ("memory") 705, and one or more input/output ("I/O") interfaces ("I/O interface") 702. Programmed computing device 710 may optionally include an image or graphics processing unit ("GPU") 707 coupled to CPU 704 and one or more peripheral cards 709 coupled to I/O interface 702. Along those lines, programmed computing device 710 may include graphics memory 708 coupled to optional GPU 707.

CPU 704 may be a type of microprocessor known in the art, such as available from IBM, Intel, ARM, and Advanced Micro Devices for example. CPU 704 may include one or more processing cores. Support circuits (not shown) may include busses, cache, power supplies, clock circuits, data registers, and the like.

Memory 705 may be directly coupled to CPU 704 or coupled through I/O interface 702. At least a portion of an operating system may be disposed in memory 705. Memory 705 may include one or more of the following: flash memory, random access memory, read only memory, magneto-resistive read/write memory, optical read/write memory, cache memory, magnetic read/write memory, and the like, as well as non-transitory signal-bearing media as described below. For example, memory 705 may include an SSD, which is coupled to I/O interface 702, such as through an SATA bus or other bus. Moreover, one or more SSDs may be used, such as for RAID or other multiple drive storage for example.

I/O interface 702 may include chip set chips, graphics processors, and/or daughter cards, among other known circuits. In this example, I/O interface 702 may be a Platform Controller Hub ("PCH"). I/O interface 702 may be coupled to a conventional keyboard, network, mouse, camera, microphone, display printer, and interface circuitry adapted to receive and transmit data, such as data files and the like.

Programmed computing device 710 may optionally include one or more peripheral cards 709. An example of a daughter or peripheral card may include a network interface card ("NIC"), a display interface card, a modem card, and a Universal Serial Bus ("USB") interface card, among other known circuits. Optionally, one or more of these peripherals may be incorporated into a motherboard hosting CPU 704 and I/O interface 702. Along those lines, GPU 707 may be incorporated into CPU 704 and/or may be of a separate peripheral card.

Programmed computing device 710 may be coupled to a number of client computers, server computers, or any combination thereof via a conventional network infrastructure, such as a company's Intranet and/or the Internet, for example, allowing distributed use. Moreover, a storage device, such as an SSD or HDD for example, may be directly coupled to such a network as a network drive, without having to be directly internally or externally coupled to programmed computing device 710, such as for example a printing device. However, for purposes of clarity and not limitation, it shall be assumed that an SSD or HDD is housed in programmed computing device 710.

Memory 705 may store all or portions of one or more programs or data, including variables or intermediate information during execution of instructions by CPU 704, to implement processes in accordance with one or more examples hereof to provide program product 720. Program product 720 may be for implementing all or portions of process flows, as described herein. Additionally, those skilled in the art will appreciate that one or more examples hereof may be implemented in hardware, software, or a combination of hardware and software. Such implementations may include a number of processors or processor cores independently executing various programs, dedicated hardware and/or programmable hardware.

Along those lines, implementations related to use of computing device 710 for implementing techniques described herein may be performed by computing device 710 in response to CPU 704 executing one or more sequences of one or more instructions contained in main memory of memory 705. Such instructions may be read into such main memory from another machine-readable medium, such as a storage device of memory 705. Execution of the sequences of instructions contained in main memory may cause CPU 704 to perform one or more process steps described herein. In alternative implementations, hardwired circuitry may be used in place of or in combination with software instructions for such implementations. Thus, the example implementations described herein should not be considered limited to any specific combination of hardware circuitry and software, unless expressly stated herein otherwise.

One or more program(s) of program product 720, as well as documents thereof, may define functions of examples hereof and can be contained on a variety of non-transitory tangible signal-bearing media, such as computer- or machine-readable media having code, which include, but are not limited to: (i) information permanently stored on non-writable storage media (e.g., read-only memory devices within a computer such as CD-ROM or DVD-ROM disks readable by a CD-ROM drive or a DVD drive); or (ii) alterable information stored on writable storage media (e.g., floppy disks within a diskette drive or flash drive or hard-disk drive or read/writable CD or read/writable DVD).

Computer readable storage media encoded with program code may be packaged with a compatible device or provided separately from other devices. In addition program code may be encoded and transmitted via wired optical, and/or wireless networks conforming to a variety of protocols, including the Internet, thereby allowing distribution, e.g., via Internet download. In implementations, information downloaded from the Internet and other networks may be used to provide program product 720. Such transitory tangible signal-bearing media, when carrying computer-readable instructions that direct functions hereof, represent implementations hereof.

Along those lines the term "tangible machine-readable medium" or "tangible computer-readable storage" or the like refers to any tangible medium that participates in providing data that causes a machine to operate in a specific manner. In an example implemented using computer system 700, tangible machine-readable media are involved, for example, in providing instructions to CPU 704 for execution as part of programmed product 720. Thus, a programmed computing device 710 may include programmed product 720 embodied in a tangible machine-readable medium. Such a medium may take many forms, including those describe above.

The term "transmission media", which includes coaxial cables, conductive wire and fiber optics, including traces or wires of a bus, may be used in communication of signals, including a carrier wave or any other transmission medium from which a computer can read. Transmission media can also take the form of acoustic or light waves, such as those generated during radio-wave and infra-red data communications.

Various forms of tangible signal-bearing machine-readable media may be involved in carrying one or more sequences of one or more instructions to CPU 704 for execution. For example, instructions may initially be carried on a magnetic disk or other storage media of a remote computer. The remote computer can load the instructions into its dynamic memory and send such instructions over a transmission media using a modem. A modem local to computer system 700 can receive such instructions on such transmission media and use an infra-red transmitter to convert such instructions to an infra-red signal. An infra-red detector can receive such instructions carried in such infra-red signal and appropriate circuitry can place such instructions on a bus of computing device 710 for writing into main memory, from which CPU 704 can retrieve and execute such instructions. Instructions received by main memory may optionally be stored on a storage device either before or after execution by CPU 704.

Computer system 700 may include a communication interface as part of I/O interface 702 coupled to a bus of computing device 710. Such a communication interface may provide a two-way data communication coupling to a network link connected to a local network 722. For example, such a communication interface may be a local area network ("LAN") card to provide a data communication connection to a compatible LAN. Wireless links may also be implemented. In any such implementation, a communication interface sends and receives electrical, electromagnetic or optical signals that carry digital and/or analog data and instructions in streams representing various types of information.

A network link to local network 722 may provide data communication through one or more networks to other data devices. For example, a network link may provide a connection through local network 722 to a host computer 724 or to data equipment operated by an Internet Service Provider ("ISP") 726 or other Internet service provider. ISP 726 may in turn provide data communication services through a world-wide packet data communication network, the "Internet" 728. Local network 722 and the Internet 728 may both use electrical, electromagnetic or optical signals that carry analog and/or digital data streams. Data carrying signals through various networks, which carry data to and from computer system 700, are exemplary forms of carrier waves for transporting information.

Wireless circuitry of I/O interface 702 may be used to send and receive information over a wireless link or network to one or more other devices' conventional circuitry such as an antenna system, an RF transceiver, one or more amplifiers, a tuner, one or more oscillators, a digital signal processor, a CODEC chipset, memory, and the like. In some implementations, wireless circuitry may be capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WiFi (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol. A computing device can include wireless circuitry that can communicate over several different types of wireless networks depending on the range required for the communication. For example, a short-range wireless transceiver (e.g., Bluetooth), a medium-range wireless transceiver (e.g., WiFi), and/or a long range wireless transceiver (e.g., GSM/GPRS, UMTS, CDMA2000, EV-DO, and LTE/LTE-Advanced) can be used depending on the type of communication or the range of the communication.

Computer system 700 can send messages and receive data, including program code, through network(s) via a network link and communication interface of I/O interface 702. In the Internet example, a server 730 might transmit a requested code for an application program through Internet 728, ISP 726, local network 722 and I/O interface 702. Received code may be executed by processor 704 as it is received, and/or stored in a storage device, or other non-volatile storage, of memory 705 for later execution. In this manner, computer system 700 may obtain application code in the form of a carrier wave.

Figure 8:
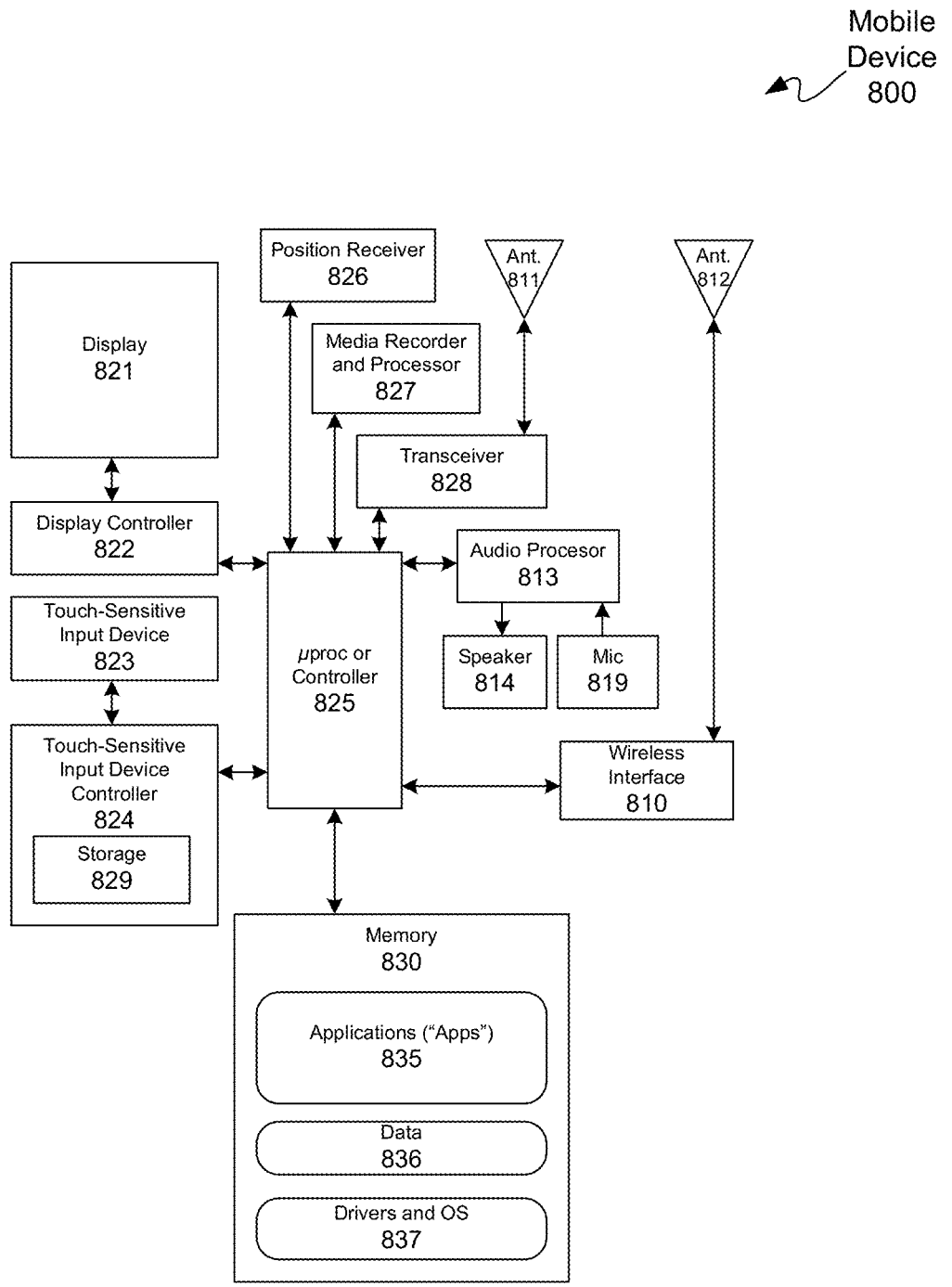
FIG. 8 is block diagram depicting an example of a portable communication device.

FIG. 8 is block diagram depicting an example of a portable communication device ("mobile device") 800. Mobile device 800 may be an example of a mobile device used to communicate with a printing device 400.

Mobile device 800 may include a wireless interface 810, an antenna 811, an antenna 812, an audio processor 813, a speaker 814, and a microphone ("mic") 819, a display 821, a display controller 822, a touch-sensitive input device 823, a touch-sensitive input device controller 824, a microprocessor or microcontroller 825, a position receiver 826, a media recorder 827, a cell transceiver 828, and a memory or memories ("memory") 830.

Microprocessor or microcontroller 825 may be programmed to control overall operation of mobile device 800. Microprocessor or microcontroller 825 may include a commercially available or custom microprocessor or microcontroller.

Memory 830 may be interconnected for communication with microprocessor or microcontroller 825 for storing programs and data used by mobile device 800. Memory 830 generally represents an overall hierarchy of memory devices containing software and data used to implement functions of mobile device 800. Data and programs or apps as described hereinabove may be stored in memory 830.

Memory 830 may include, for example, RAM or other volatile solid-state memory, flash or other non-volatile solid-state memory, a magnetic storage medium such as a hard disk drive, a removable storage media, or other suitable storage means. In addition to handling voice communications, mobile device 800 may be configured to transmit, receive and process data, such as Web data communicated to and from a Web server, text messages (also known as short message service or SMS), electronic mail messages, multimedia messages (also known as MMS), image files, video files, audio files, ring tones, streaming audio, streaming video, data feeds (e.g., podcasts), and so forth.

In this example, memory 830 stores drivers, such as I/O device drivers, and operating system programs ("OS") 837. Memory 830 stores application programs ("apps") 835 and data 836. Data may include application program data.

I/O device drivers may include software routines accessed through microprocessor or microcontroller 825 or by an OS stored in memory 830. Apps, to communicate with devices such as the touch-sensitive input device 823 and keys and other user interface objects adaptively displayed on a display 821, may use one or more of such drivers.

Mobile device 800, such as a mobile phone or a cell phone, may include a display 821. Display 821 may be operatively coupled to and controlled by a display controller 822, which may be a suitable microcontroller or microprocessor programmed with a driver for operating display 821.

Touch-sensitive input device 823 may be operatively coupled to and controlled by a touch-sensitive input device controller 824, which may be a suitable microcontroller or microprocessor. Along those lines, touching activity input via touch-sensitive input device 823 may be communicated to touch-sensitive input device controller 824. Touch-sensitive input device controller 824 may optionally include local storage 829.

Touch-sensitive input device controller 824 may be programmed with a driver or application program interface ("API") for apps 835. An app may be associated with a service, as previously described herein, for use of a SaaS. One or more aspects of above-described apps may operate in a foreground or background mode.

Microprocessor or microcontroller 825 may be programmed to interface directly touch-sensitive input device 823 or through touch-sensitive input device controller 824. Microprocessor or microcontroller 825 may be programmed or otherwise configured to interface with one or more other interface device(s) of mobile device 800. Microprocessor or microcontroller 825 may be interconnected for interfacing with a transmitter/receiver ("transceiver") 828, audio processing circuitry, such as an audio processor 813, and a position receiver 826, such as a global positioning system ("GPS") receiver. An antenna 811 may be coupled to transceiver 828 for bi-directional communication, such as cellular and/or satellite communication.

Mobile device 800 may include a media recorder and processor 827, such as a still camera, a video camera, an audio recorder, or the like, to capture digital pictures, audio and/or video. Microprocessor or microcontroller 825 may be interconnected for interfacing with media recorder and processor 827. Image, audio and/or video files corresponding to the pictures, songs and/or video may be stored in memory 830 as data 836.

Mobile device 800 may include an audio processor 813 for processing audio signals, such as for example audio information transmitted by and received from transceiver 828. Microprocessor or microcontroller 825 may be interconnected for interfacing with audio processor 813. Coupled to audio processor 813 may be one or more speakers 814 and one or more microphones 819, for projecting and receiving sound, including without limitation recording sound, via mobile device 800. Audio data may be passed to audio processor 813 for playback. Audio data may include, for example, audio data from an audio file stored in memory 830 as data 836 and retrieved by microprocessor or microcontroller 825. Audio processor 813 may include buffers, decoders, amplifiers and the like.

Mobile device 800 may include one or more local wireless interfaces 810, such as a WiFi interface, an infrared transceiver, and/or an RF adapter. Wireless interface 810 may provide a Bluetooth adapter, a WLAN adapter, an Ultra-Wideband ("UWB") adapter, and/or the like. Wireless interface 810 may be interconnected to an antenna 812 for communication. As is known, a wireless interface 810 may be used with an accessory, such as for example a hands-free adapter and/or a headset. For example, audible output sound corresponding to audio data may be transferred from mobile device 800 to an adapter, another mobile radio terminal, a computer, or another electronic device. In another example, wireless interface 810 may be for communication within a cellular network or another Wireless Wide-Area Network (WWAN).

Figure 9:
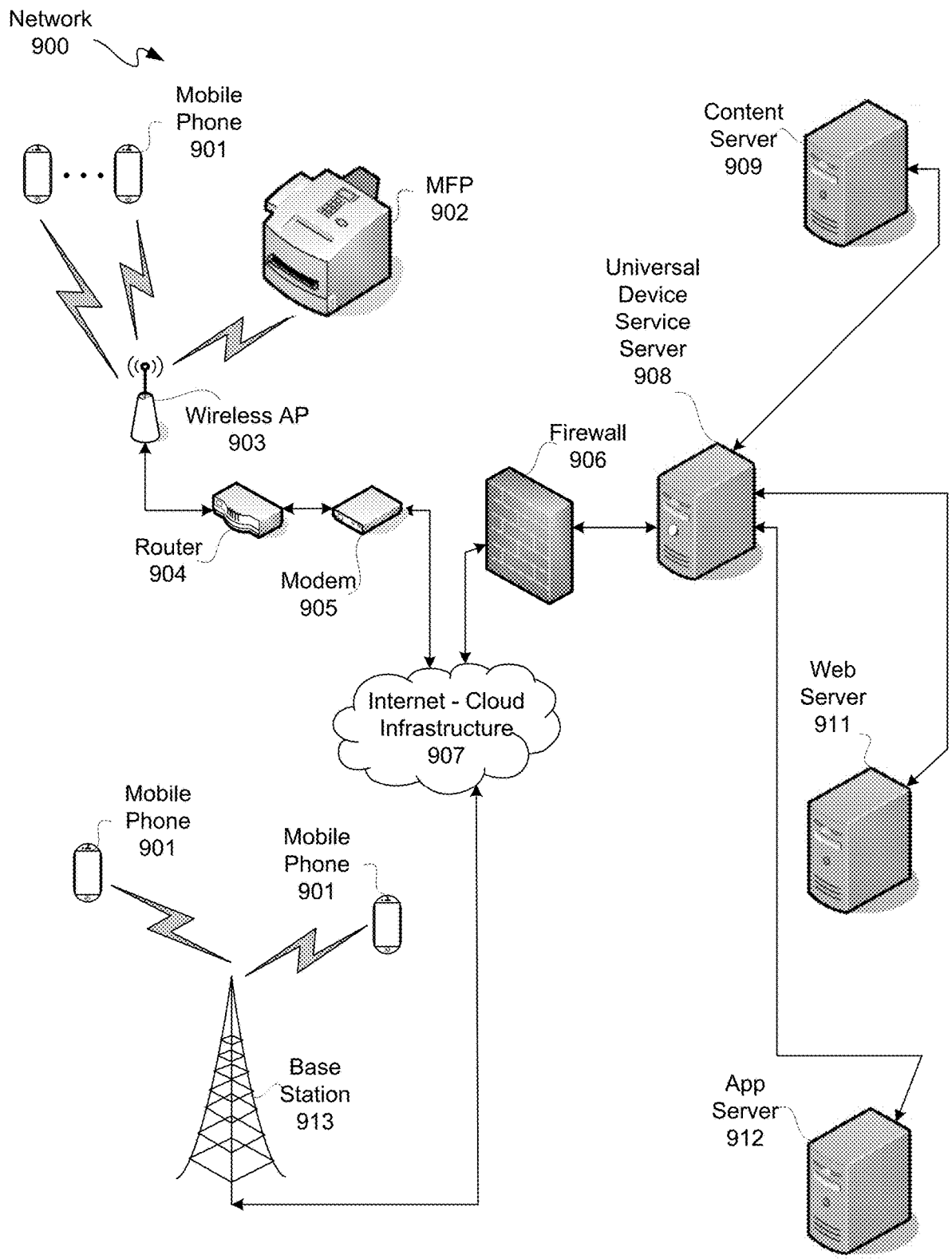
FIG. 9 is a pictorial diagram depicting an example of a network.

FIG. 9 is a pictorial diagram depicting an example of a network 900, which may be used to provide an SaaS platform for hosting a service or micro service for use by a user device, as described herein. Along those lines, network 900 may include one or more mobile phones 901, pads, notebooks, and/or other web-usable devices in wired and/or wireless communication with a wired and/or wireless access point ("AP") 903 connected to or of a wireless router. Furthermore, one or more of such web-usable wireless devices 901 may be in wireless communication with a base station 913. Additionally, a desktop computer and/or an MFP 902, each of which may be web-usable devices, may be in wireless and/or wired communication to and from router 904.

Wireless AP 903 may be connected for communication with a router 904, which in turn may be connected to a modem 905. Modem 905 and base station 913 may be in communication with an Internet-Cloud infrastructure 907, which may include public and/or private networks.

A firewall 906 may be in communication with such an Internet-Cloud infrastructure 907. Firewall 906 may be in communication with a universal device service server 908. Universal device service server 908 may be in communication with a content server 909, a web server 914, and/or an app server 912. App server 912, as well as a network 900, may be used for downloading an app or one or more components thereof for accessing and using a service or a micro service as described herein.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. A method, comprising:
    checking a log associated with a printing device for at least one print job having an incomplete state for a status of the at least one print job;
    for the at least one print job having the incomplete state, determining data input for the at least one print job is for a completely received and fully stored version of the at least one print job in storage of the printing device including in a rasterized form; and
    restarting the at least one print job using the data input recovered from the storage for the data input determined to be complete and fully stored in the storage.

2. The method according to claim 1, further comprising:
    rebooting the printing device; and
    invoking the checking after the rebooting for a recovery mode.

3. The method according to claim 2, further comprising:
    rasterizing the data input with a raster image processor of the printing device for storing the data input in the storage in the rasterized form.

4. The method according to claim 3, wherein the checking, the determining, and the restarting are performed for the recovery mode of the printing device being set to an active state.

5. The method according to claim 4, further comprising spooling the at least one print job by or for the printing device.

6. The method according to claim 4, further comprising:
deleting a first partial preview for the print job;
creating a second partial preview for the print job using at least a portion of the data input recovered from the storage; and
updating the status from the incomplete state to a recovered state in the log.

7. The method according to claim 4, wherein the log includes a timestamp for the at least one print job, the method further comprising:
checking the timestamp to determine whether less than a threshold amount of delay has passed since the at least one print job was received by the printing device; and
responsive to the delay being less than the threshold amount, initiating the restarting of the at least one print job using the data input recovered from the storage.

8. The method according to claim 1, further comprising:
clearing an interruption of the printing device; and
invoking the checking after the clearing for a recovery mode.

9. The method according to claim 1, wherein the data input for the at least one print job is selected from a scan input, a page description language input, or a fax input for the printing device being a multi-function printer.

10. The method according to claim 9, wherein for the data input being the page description language input, the method further comprises rasterizing the data input with a raster image processor of the printing device for storing the data input in the storage in the rasterized form.

11. The method according to claim 10, wherein the storage has a non-volatile configuration to store the data input in the storage in the rasterized form for recovery therefrom after a rebooting of the printing device.

12. The method according to claim 11, further comprising spooling the at least one print job in the storage by the printing device.

13. An apparatus, comprising:
a printing device configured with a job manager having control of an input management device, an edit management device, and an output management device;
a storage of the printing device configured for communication with the input management device, the edit management device, and the output management device;
the input management device configured to:
receive a job; and
for the job in a page description language, rasterize the job with a raster image processor of the printing device to provide one or more rasterized pages;
the storage configured to store the job with the one or more rasterized pages and maintain a log to record status of the job;
the edit management device coupled to the storage to obtain the one or more rasterized pages and in communication with the input management device to receive a first handoff of the job;
the output management device coupled to the storage to obtain the one or more rasterized pages, for communication with the edit management device to receive a second handoff of the job, and to provide the one or more rasterized pages to a print engine of the printing device; and
the job manager configured to:
check the log for the job having an incomplete state for the status of the job;
for the job having the incomplete state, determine the one or more rasterized pages are for a completely received and fully stored version of the job in the storage; and
restart the job using the one or more rasterized pages recovered from the storage for the one or more rasterized pages determined to be complete and fully stored in the storage.

14. The apparatus according to claim 13, wherein the input management device is configured to receive for the job at least one of a print job, a scan job or a fax job with the scan job or the fax job input to the input management device with the one or more rasterized pages to provide to the storage.

15. The apparatus according to claim 14, wherein:
the printing device is configured to timestamp receipt of the job;
the log includes the timestamp for the job; and
the job manager is configured to check the timestamp to determine less than a threshold amount of delay has passed since the job was received by the printing device prior to the restart of the job.

16. The apparatus according to claim 15, wherein the printing device is a multi-function printer.

17. The apparatus according to claim 16, wherein the printing device is configured to spool the job.

18. The apparatus according to claim 16, wherein the job manager responsive to a recovery mode of the printing device being invoked is configured to:
delete a first partial preview for the job;
create a second partial preview for the job using at least one of the one or more rasterized pages recovered from the storage; and
update the status from the incomplete state to a recovered state in the log.

19. The apparatus according to claim 16, wherein the storage has a non-volatile configuration to store the one or more rasterized pages in the storage for recovery therefrom after a reboot of the printing device for the restart of the at least one print job with the one or more rasterized pages obtained from the storage.

20. The apparatus according to claim 19, wherein the printing device is a multi-function printer.

* * * * *